April 19, 1938.  C. B. SCHNEIBLE  2,114,786
COLUMN
Filed Aug. 30, 1935  2 Sheets-Sheet 2

Inventor:
Claude B. Schneible.
By Dyrenforth, Lee, Chritton & Wiles.
Attys.

Patented Apr. 19, 1938

2,114,786

UNITED STATES PATENT OFFICE 2,114,786

COLUMN

Claude B. Schneible, Chicago, Ill.

Application August 30, 1935, Serial No. 38,634

5 Claims. (Cl. 261—79)

This invention relates to improvements in columns, such as dust-separating columns, distilling columns, dephlegmating towers, scrubbing towers, absorption towers and similar towers.

An object of the invention is to provide means fo. forming a rotating sheet of liquid about a portion of the column to wash the column and to carry away the heavier particles of material thrown out by centrifugal force. A further object is to provide a deflector adjacent the lower portion of the column by directing the liquid toward the walls of the column. A still further object is to provide improved means for withdrawing the purified air etc., from the column. Other specific objects of the invention will appear as the specification proceeds.

The invention is illustrated, in a preferred embodiment, by the accompanying drawings, in which—

Figure 1:
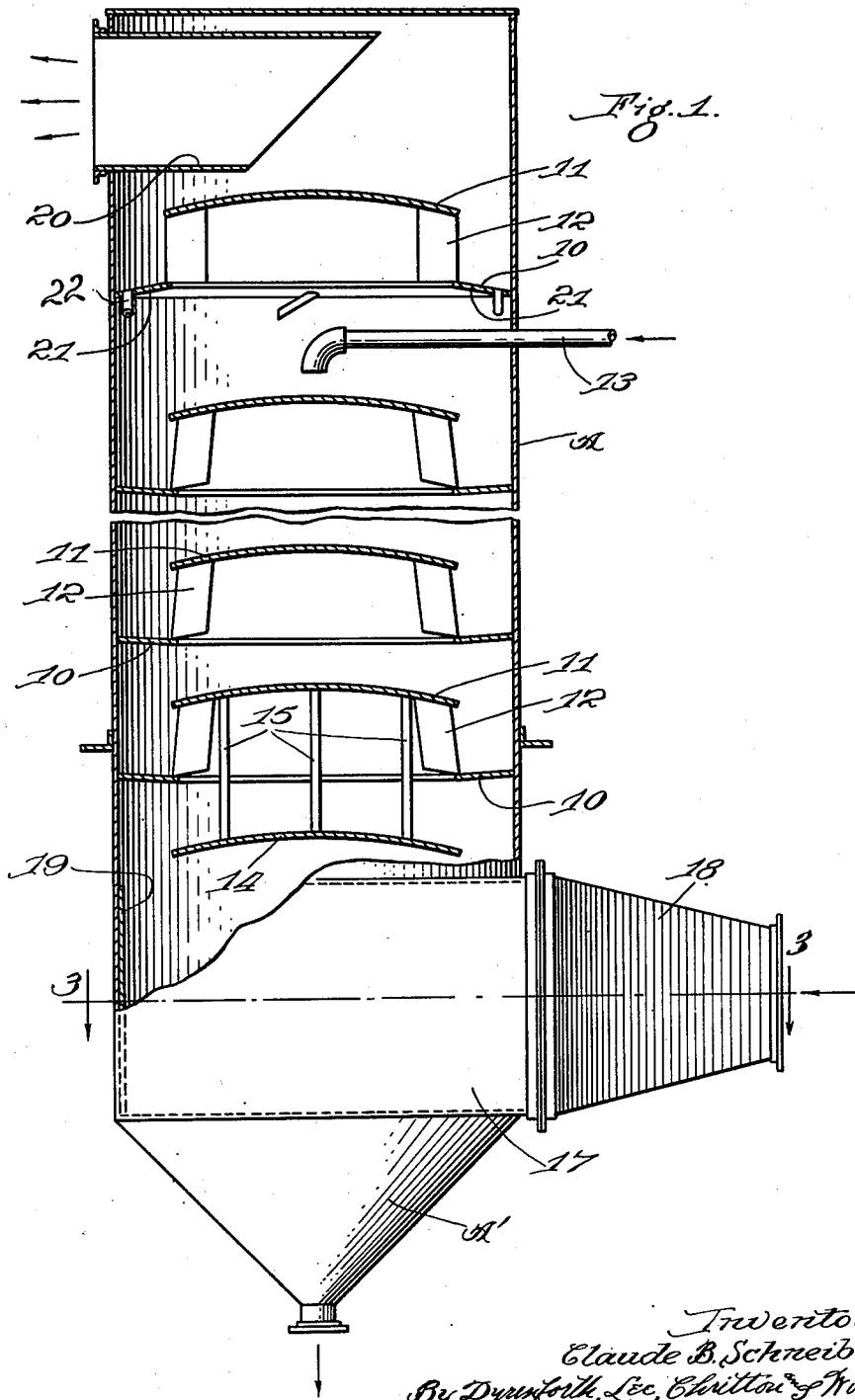
Figure 2:
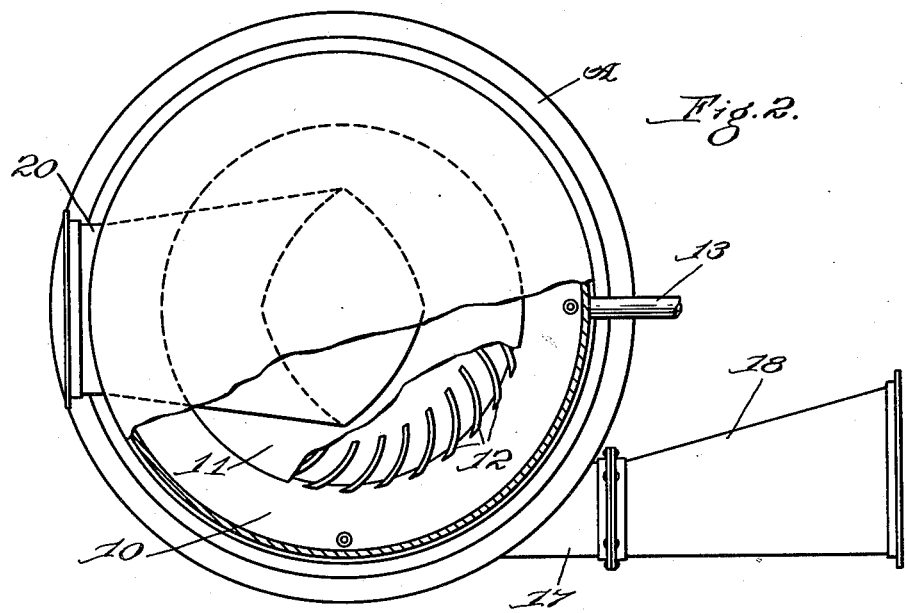
Figure 3:
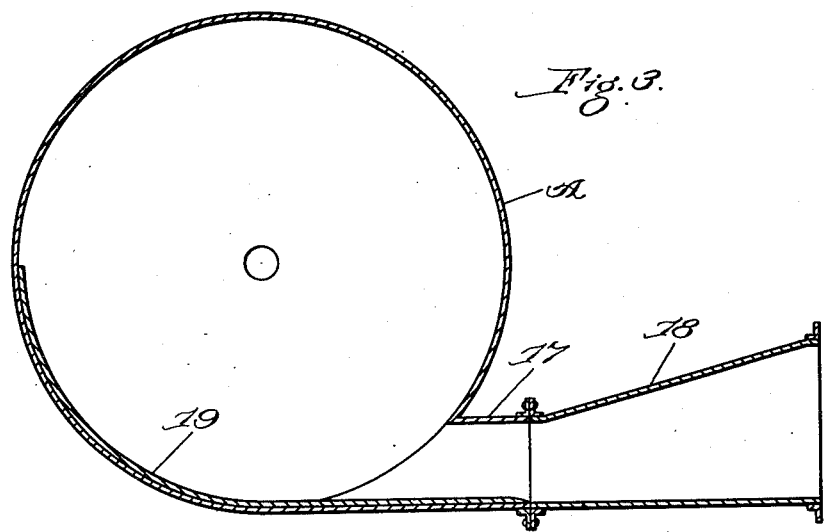

Figure 1 is a vertical sectional view of a column embodying my invention; Fig. 2, a top plan view, a portion of the top wall being broken away; and Fig. 3, a transverse sectional view, the section being taken as indicated at line 3—3 of Fig. 1.

In the illustration given, the casing A is provided on its interior preferably with a series of baffles of the plate and ring type. 10 designates the baffle ring and 11 the plate. Between the plates and rings are secured vanes 12 which impart a whirling or circular motion to the air, vapor, or other gaseous material passing upwardly through the casing. The baffle plates and vanes are described in greater detail in my Patents Nos. 1,783,813 and 1,790,596.

In the upper portion of the column is a liquid inlet pipe 13, the end of the pipe being turned downwardly at about the center of the column. Below the lowermost baffle is supported a curved deflector 14. The deflector 14 is preferably suspended by rods 15 which are welded at their upper ends to the lowermost plate 11.

Below deflector 14, the casing A provides a tangential rectangular air or vapor inlet 17 to which is connected an inlet pipe fitting 18. Adjacent the inner side of pipe 18 and extending about half way about the casing A is a wear ring 19 which is designed to protect the wall of the casing from abrasion caused by foreign particles carried in the incoming air or vapor.

The purified air, vapor or gas is drawn off at the top of the column through the horizontal outlet pipe 20 which has an inclined opening in about the center of the column. With this construction, the purified air is drawn from the central portion of the rotating annulus of air, the heavier portions of the annulus being carried by centrifugal force near the walls of the column.

The casing A is provided below the inlet 17 with a funnel-shaped discharge portion A'. Any suitable outlet connection may be connected with the lower flanged end of casing portion A'.

The topmost baffle ring 10, which is positioned above pipe 13, is preferably downwardly inclined at 21 to provide a trough for receiving entrained liquid thrown out of the air above the trough. Inclined pipes 22 extend downwardly from the trough and at an angle inclined in the direction of rotation of the air. The rotating air passing the pipes 22 tends to suck liquid therethrough from the trough.

Assuming that the column is to be used for the purpose of removing dust particles from air, the dust-laden air is passed through pipe 18 into the tangential inlet 17. The entering air is thus given a circular motion, and as it is drawn upwardly through the succeeding baffles, the vanes 12 maintain the circular motion of the air. The whirling mass of air is contacted in its upward movement by a downwardly flowing stream of liquid from the pipe 13. The stream of liquid is given a whirling motion by contact with the air and the liquid particles are brought into contact with the solid dust particles carried by the air, thus washing the dust particles downwardly through the column. Near the bottom portion of the column, the deflector 14 directs the whirling liquid stream against the walls of the column, thus washing the walls free of dust. The rotating liquid sheet also forms a blanket to protect the walls from the dust particles which are thrown out by centrifugal force against the walls. The sheet of liquid further serves the purpose of collecting the heavy dust particles which are thrown out by centrifugal force in the lower portion of the column, carrying them downwardly through the funnel portion A'. The funnel portion A' is so designed as to enable the rotating sheet of liquid to move downwardly without interference, while thoroughly cleaning the inner surface of the column from dust, mud, etc. The rotating air distributes the liquid evenly and uniformly over the bottom portion of the column.

By providing a rotating liquid sheet in the bottom of the column adjacent the entrance of the dust-laden air, a very substantial amount of the dust is removed at once as it is thrown out by centrifugal force, thus saving the upper portion of the column from contact with such abrasive material.

If the column is used as a distilling column, dephlegmating tower, scrubbing tower, absorption tower or the like, the deflector causes the rotating stream of liquid to contact the heavier portions of the incoming vapors, etc., at the very outset and to remove them from the column, the liquid stream at the same time keeping the lower portion of the column free from any foreign accumulations. The outlet pipe 20 withdraws vapors, etc., from the very center of the rotating vapor annulus.

Although the present invention has been described in connection with the details of a specific embodiment thereof, it is not intended that such details shall be regarded as limitations upon the scope of the invention except insofar as included in the accompanying claims, and in the accompanying claims where the words "gas", "vapor", "air", etc., are used, it will be understood that such terms are used interchangeably and in their broad sense to include all vapors, gases and the like.

I claim:

1. In a column of the character set forth provided with a funnel-shaped bottom, an inlet pipe arranged tangentially with respect to said column and just above said bottom, a deflector inclined downwardly toward its peripheral edge and adapted to direct the liquid to the inside walls of said column adjacent said inlet, means for introducing liquid above said deflector, and outlet means at the top of the column.

2. In a column of the character set forth, a casing providing a chamber, the lower portion of said chamber being equipped with a vapor or gas inlet and means for starting said air or gas in rotational movement, baffles arranged therein in spaced relation, vanes carried by said baffles for maintaining said incoming vapor or gas in circular motion, means for introducing a liquid into the upper portion of said casing, and a deflector for directing the liquid against the walls of said casing to provide a rotating sheet of liquid about said casing walls adjacent said inlet.

3. In a column of the character set forth, a casing providing a chamber, baffles arranged therein in spaced relation, said baffles being provided with curved vanes for imparting into the ascending gas or vapor a circular motion, said casing being equipped with an inlet for dust-laden air and with means for giving the air a rotational movement, means for introducing a liquid to the upper portion of said column, and a deflector for directing the liquid against the walls of said casing above said vapor or gas inlet to provide a rotating sheet of liquid about said inlet the walls of said casing being of uniform cylindrical form about said inlet.

4. In a column of the character set forth, a casing providing a chamber and having a funnel-shaped bottom portion, baffles arranged in said casing in spaced relation, a gas inlet in the lower portion of said column and tangentially positioned with respect to said bottom, said baffles being provided with vanes for giving said gas a circular motion, means for withdrawing said gas at the top of said column, means for introducing liquid into the upper portion of said column, and a deflector plate for directing said liquid against the walls of said casing above said gas inlet.

5. In a column of the character set forth, means for introducing a gas in the bottom of said column, a series of baffles in said column, means associated with said baffles for giving said gas a circular motion, means for passing a liquid downwardly through said column in contact with said gas, a trough supported in the upper portion of said column and adapted to receive entrained liquid thrown out of said gas, and at least one drain pipe communicating with said trough and being inclined in the direction of rotation of said gas, whereby the passage of said gas by the lower end of said pipe tends to draw liquid from said trough downwardly through said pipe.

CLAUDE B. SCHNEIBLE.